Jan. 17, 1928.                                                      1,656,592
J. D. MERRIFIELD
METHOD OF FORMING SCREW THREADS
Filed Feb. 19, 1923          2 Sheets-Sheet 1
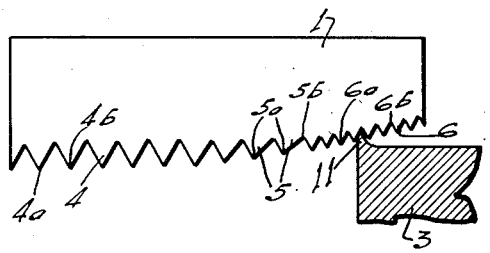
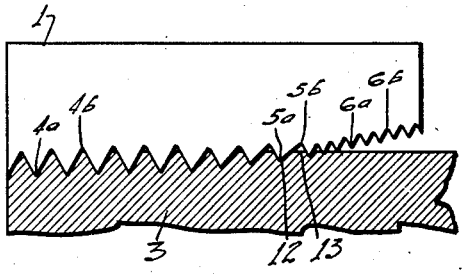
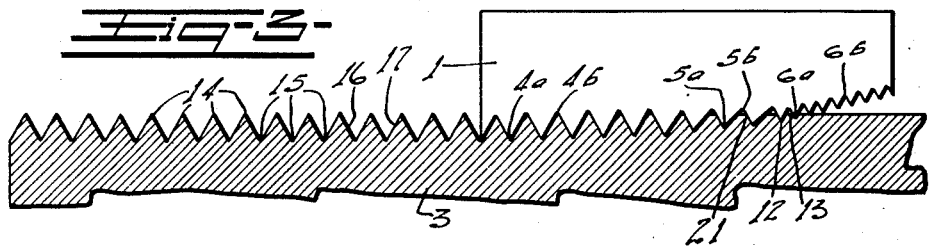
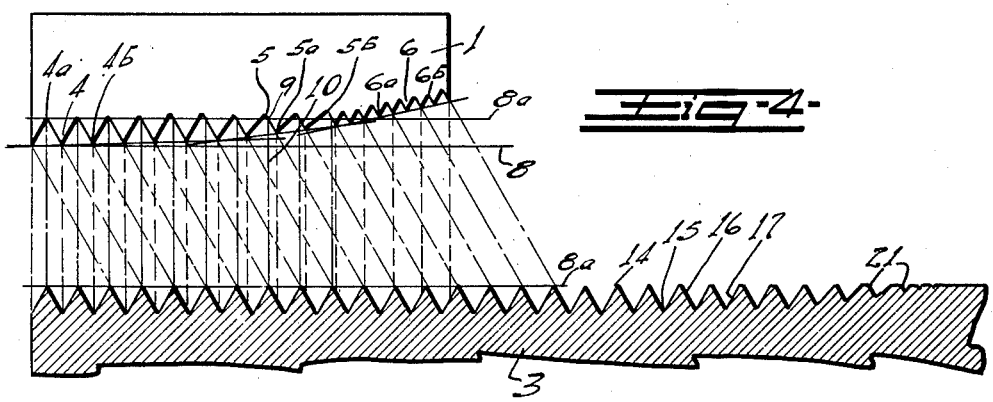
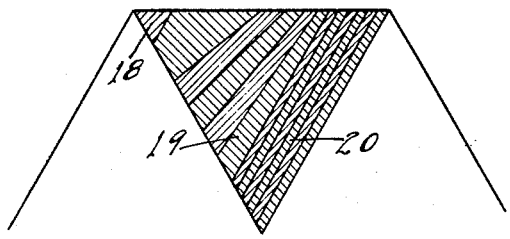
Inventor
John D. Merrifield
Attorney Jan. 17, 1928.                                               1,656,592
J. D. MERRIFIELD
METHOD OF FORMING SCREW THREADS
Filed Feb. 19, 1923      2 Sheets-Sheet 2
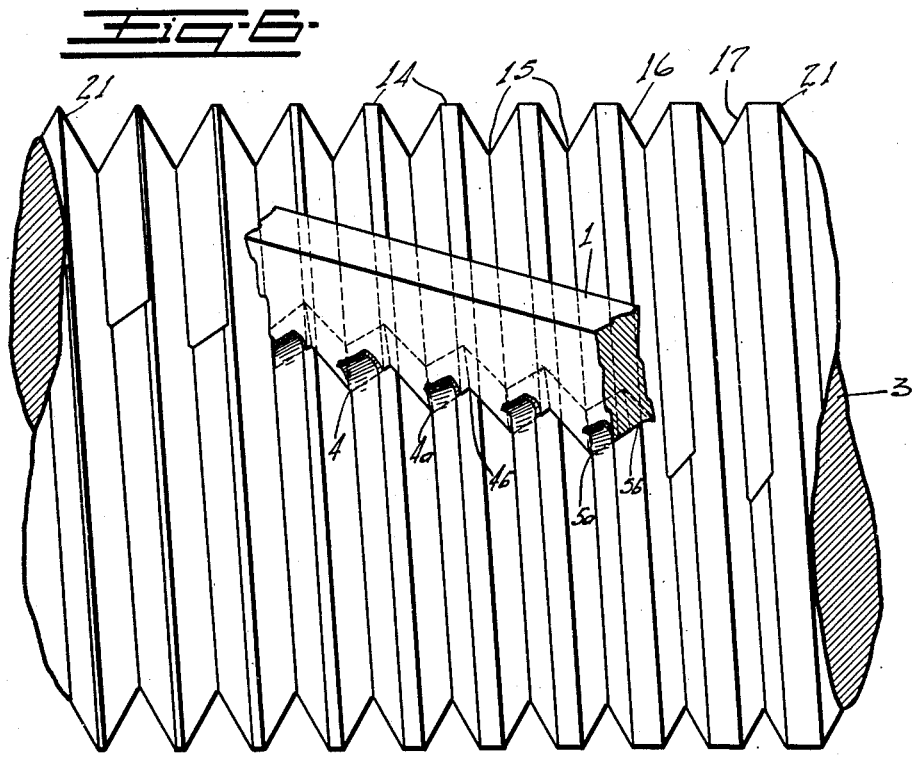
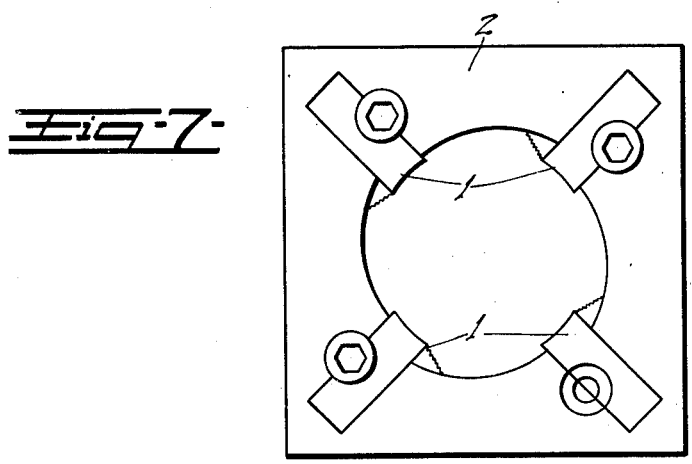
Inventor
John D. Merrifield
Attorney Patented Jan. 17, 1928.

1,656,592

UNITED STATES PATENT OFFICE.

JOHN D. MERRIFIELD, OF ERIE, PENNSYLVANIA, ASSIGNOR TO REED MANUFACTURING COMPANY, OF ERIE, PENNSYLVANIA, A CORPORATION OF PENNSYLVANIA.

METHOD OF FORMING SCREW THREADS.

Application filed February 19, 1923. Serial No. 619,878.

Heretofore screw threads have been formed where a plurality of threads have been cut simultaneously as with a tap, or die, by removing the metal from both slopes of the threads being cut. By my method I remove the metal from one slope of the thread being cut. In doing this I preferably use one slope as a guiding and thrusting surface and cut the opposite slope. In carrying this out I use a cutter having the spiral of the crest of the threads cut extending along the slopes of the thread of the cutter as distinguished from along the centers of the troughs as with ordinary methods.

I prefer also to start the threads with a V-shaped groove and flattened crests as distinguished from a trough with a flat bottom and pointed crested thread. With this method a greater amount of metal is left in the threads of the bar being cut and by this method a die may be started with the threads as formed forming the feeding means. In carrying out my method I arrange the cutting tool diagonally and adjust this to correct the lead of the thread, the greater inclination, or angularity of the cutter biting into the metal more readily and giving a quicker lead whereas a more nearly axial relation of the cutter tends to make the lead lag. I further utilize the thrusting action axially at the heel of the cutting tool for forcing the opposite face of the cutting tool into the opposite slope and by giving the teeth this added inclination provide clearance for the cutting slope of the teeth.

The device for practicing my method is illustrated in the accompanying drawings as follows:—

Fig. 1 shows a side elevation of a chaser as it starts work on a bar.

Fig. 2 a similar view with the chaser slightly further advanced.

Fig. 3 a view of the chaser completing its cut.

Fig. 4 a diagrammatic view showing the shapes of the teeth of the chaser.

Fig. 5 a sectional view showing the successive cuts made by my method.

Fig. 6 a plan view of a chaser showing the relation of the teeth and angularity of the chaser to the bar.

Fig. 7 an elevation of what is commonly termed a solid die in which the chasers may be mounted.

1 marks the chaser, 2 a die in which the chasers are mounted. The die body as shown is usually termed a solid die. It should be understood, however, that the chasers may be otherwise formed, if desired. 3 marks a bar being cut.

The chaser has the threads 4 which finally shape the thread being cut, the starting threads 5 having an inclination as heretofore suggested less abrupt on the forward slope than the rear slope and the fine threads 6, the principal function of which is to facilitate starting with an upset end on the bar. The threads 4 have the crests $4^a$ and the troughs $4^b$; the threads 5 the crests $5^a$ and troughs $5^b$; and the threads 6 the crests $6^a$ and the troughs $6^b$. It will be noted that the threads 6 are finer than the threads 4 and 5 and are multiple threads of the same lead as the threads 4. In Fig. 1 I have shown an up-set end 11 of a bar as it is engaged by the fine teeth 6. It will be noted that these teeth are formed on a taper and that being finer and closer together some of the fine threads are brought into proper engagement with the end of the work through quite a large variation of diameter of the bar. In Fig. 2 the first of the threads 5 have removed this up-set portion of the crests of the small threads 6 and formed a threaded groove in the bar. It will be noted that the material between the initial grooves 12 is flat as at 13 and thus there is a large body of the softer metal of the bar which is opposed to the stripping of the thread. This is the reverse of the ordinary cutting die and is one of the factors in making it possible to start this die on a bar without the usual lead screw, the other factor being, as heretofore expressed, the less abrupt inclination of the forward slopes of the starting threads 5.

As shown in Fig. 4 I have carried the crests of the threads 4, 5 and 6 to the threads of a bar cut indicating the relation between these crests. I have also indicated a line 8 which is parallel to the axis of a bar to be cut and coincident with the trough of the finished thread, or in other words coincident with the crests of the last cutting tooth of the die. I have also shown a line $8^a$ coinciding with the crests of the finished thread. I have extended by dash lines the rearward slopes of the die, these ordinarily being thirty degrees, I have also extended from the points 9 marking the intersection between the rear slopes of the teeth of the die and the line 8ª dash lines 10 which extend from the points 9 to the threads of the finished bar.

The finished thread appears in Fig. 3 with the crests 14, troughs 15, forward slope 16 and rearward slope 17 and in Fig. 5 I have shown the cut 18 made by the tooth 6, the cuts 19 made by the starting teeth 5 and the following cuts 20 made by the teeth 4 along the rearward slope of the thread being cut by the forward slope of the die. It will be noted that the lines 10 intersect the lines 8 at points off-set from the crests 4ᵇ and the distances between the crests 4ᵇ are greater than the distances between the crests 14, the points of intersection 9 indicating the points on the slope of the teeth of the die traversed by the crests 14 as they are formed. Thus it will be seen that the crests 14 on the bar do not correspond with the bottoms of the troughs 4ª and on the other hand the crests 4ᵇ do not correspond with the bottoms of the troughs 15, the intersection of the various dash lines with the line 8 indicating the differences.

It will be noted that the spiral 21 along the front edge of the flat crest as the thread is formed finally becomes the crest of the thread (assuming the bar has a diameter of the crest of the thread) and this spiral 21 follows along the rear slope of the die thread and that the rearward slope of the die coincides at all times with the forward slope of the thread as it is formed and crowds the cutting edge of the die into the rearward slope of the work being cut. It will be noted by observing Fig. 6 that the spiral of the die is slightly faster than the thread cut. The effect of this is a crowding of the heel along the guiding rear slope and a slight relief of the slope of the die back of the cutting edge through the lack of coincidence between the slope of the die back of the cutting edge and the slope cut.

I prefer to arrange the die diagonally with an angle as clearly shown in Fig. 6. This gives, it will be seen a cutting rake in an axial direction to the cutting edge along the forward slope of the tooth of the die in relation to the rearward slope of the thread being cut and on which the cut is made. This is of particular advantage in a die cutting only on the forward slope in that the negative rake along the rear slope making no cut, or practically no cut, this negative rake at the rear is not detrimental. This diagonal arrangement of the die is of particular advantage in that it may be varied to correct the self lead of the die. By giving a greater inclination it has a greater tendency to bite in and increase the lead. By making the chaser parallel with the axis the die has a tendency to lag from the desired lead. By properly adjusting the angle the die may be made self-leading with correct pitch.

It will be understood that this die makes a continuous chip or ribbon as distinguished from the crumbled chip where the cut is on both slopes and consequently has to curl a channel-shaped cross section of metal. The throw of this chip in this die can be controlled to a certain extent by varying the diagonal relation, or angle of the setting of the chaser. This, as before stated, is possible because the cut being made on one slope, the added rake given by changing the angle of the chaser is not detrimental because of the absence of any material cut on the opposite slope. By changing the throw of the chip in relation to the general construction of the die, the die can be better made to clear itself of chips. Ordinarily it will pass the chip out of the rear of the die with the die cutting as shown in the drawings, or it will throw the chip to the front of the die where the rear slope of the thread being cut is the one acted upon, the angularity of the chaser under this condition being reversed. This die cutting only on one slope backs off with greater ease and with less chip interference than the ordinary die. This seems to be due to the fact that the chips are all on one side and the teeth as they back away clear this wall.

While I have shown and described my invention as applied to cutting external threads and also as cutting the forward slope of the threads, it will be understood that I do not wish to be limited in the broader features of my invention to such threads, or to this slope.

What I claim as new is:—

1. The method of forming screw threads which consists in cutting tapered multiple starting threads having pointed troughs having the lead of the finished thread but with teeth finer and having their crests closer together than the finished thread, and advancing the cut along certain of said threads to form the finished thread.

2. The method of forming screw threads which consists in starting with threads having pointed troughs finer than the finished thread but of the same inclination, advancing from this to threads having one slope less abrupt than the finished thread, and advancing from this to the slope of the finished thread.

3. The method of forming screw threads which consists in starting with threads having pointed troughs finer than the finished thread but of the same inclination, advancing from this to threads having one slope less abrupt than the finished thread, and advancing from this to the slope of the finished thread, the cut being made from one slope of the thread.

4. The method of forming screw threads which consists in starting with threads having pointed troughs finer than the finished thread, advancing along certain of said threads with a thread having the slope in front of the trough inclined less abruptly than the finished thread, and advancing to the slope having the inclination of the finished thread.

5. The method of forming screw threads which consists in starting with threads having pointed troughs finer than the finished thread, advancing along certain of said threads with a thread having the slope in front of the trough inclined less abruptly than the finished thread, and advancing to the slope having the inclination of the finished thread, said cut being along one slope of the thread.

In testimony whereof I have hereunto set my hand.

JOHN D. MERRIFIELD.